(12) United States Patent
Jeon et al.

(10) Patent No.: US 8,670,420 B2
(45) Date of Patent: Mar. 11, 2014

(54) METHOD FOR OPERATING DEVICE IN PERSONAL AREA NETWORK

(75) Inventors: Young Ae Jeon, Daejeon-si (KR); Sang Jae Lee, Daejeon-si (KR); Sang Sung Choi, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 176 days.

(21) Appl. No.: 13/307,155

(22) Filed: Nov. 30, 2011

(65) Prior Publication Data

US 2012/0140745 A1 Jun. 7, 2012

(30) Foreign Application Priority Data

Dec. 2, 2010 (KR) .................. 10-2010-0122258

(51) Int. Cl.
*H04J 3/00* (2006.01)
*H04W 72/04* (2009.01)
*H04B 7/212* (2006.01)
*H04W 4/00* (2009.01)

(52) U.S. Cl.
USPC ............ 370/336; 370/347; 370/338; 370/329

(58) Field of Classification Search
USPC ......... 370/256, 329–338, 345–347, 350, 442, 370/478
See application file for complete search history.

(56) References Cited

U.S. PATENT DOCUMENTS

| 7,508,811 | B2* | 3/2009 | Shao et al. | 370/347 |
| 8,331,311 | B2* | 12/2012 | Lee et al. | 370/330 |
| 2005/0201348 | A1* | 9/2005 | Chitrapu et al. | 370/338 |
| 2006/0215601 | A1* | 9/2006 | Vleugels et al. | 370/328 |
| 2011/0158204 | A1* | 6/2011 | Shin et al. | 370/336 |
| 2011/0182262 | A1* | 7/2011 | Patel et al. | 370/329 |

* cited by examiner

*Primary Examiner* — Jung Park
*Assistant Examiner* — Chuong M Nguyen
(74) *Attorney, Agent, or Firm* — Staas & Halsey LLP

(57) ABSTRACT

A method for operating a device in a personal area network (PAN), includes: obtaining physical layer information regarding a physical layer; scanning a channel on the basis of the physical layer information; selecting a channel on the basis of channel information obtained through the channel scanning process; determining whether or not there is a PAN coordinator with respect to the selected channel; and when a PAN coordinator does not exist in the selected channel, transmitting a beacon signal including information regarding a superframe structure, wherein the superframe structure includes at least one sub-superframe, and the information regarding the superframe structure includes information regarding the number of beacon slots for transmitting a beacon signal in each sub-superframe, the number of data slots for transmitting data in each sub-superframe, and the number of sub-superframes.

14 Claims, 11 Drawing Sheets

METHOD FOR OPERATING DEVICE IN PERSONAL AREA NETWORK

CROSS-REFERENCE TO RELATED APPLICATIONS

This application claims the benefit of priority of Korean Patent Application No. 10-2010-0122258 filed on Dec. 2, 2010 which is incorporated by reference in its entirety herein.

BACKGROUND OF THE INVENTION

1. Field of the Invention

The present invention relates to wireless communication and, more particularly, to a method for operating a device in a personal area network.

2. Description of the Related Art

A personal area network (PAN) refers to a personalized short-range network in which various devices such as electric, electronic, information communication devices, communicate with each other within a short-range area of a radius of a tens of meters.

In the related art PAN, a user must select a service terminal according to a service interface standard of a service provider. Namely, the related art PAN is a service provider-centered environment. Recently, switching to a user-centered environment is required with respect to the PAN. Namely, a service provider is required to provide a service such that a user interface standard fitting the user's terminal to thus provide a ubiquitous service environment.

In order to provide such a user-centered ubiquitous service environment, a method for operating a device capable of dynamically and selectively applying various transfer rates such as from tens of Kbps to tens of Mbps and simultaneously providing various services on the basis of heterogeneous or homogeneous physical layers is required.

SUMMARY OF THE INVENTION

Therefore, an object of the present invention is to provide a method for operating a device in a personal area network (PAN).

In order to accomplish the object, there is provided a method for operating a device in a personal area network (PAN), including: obtaining physical layer information regarding a physical layer; scanning a channel on the basis of the physical layer information; selecting a channel on the basis of channel information obtained through the channel scanning process; determining whether or not there is a PAN coordinator with respect to the selected channel; and when a PAN coordinator does not exist in the selected channel, transmitting a beacon signal including information regarding a superframe structure, wherein the superframe structure includes at least one sub-superframe, and the information regarding the superframe structure includes information regarding the number of beacon slots for transmitting a beacon signal in each sub-superframe, the number of data slots for transmitting data in each sub-superframe, and the number of sub-superframes.

The superframe structure may be $2^X * 2^Y * 2^Z * 256$ micro seconds in a time domain, wherein X is a parameter indicating the number of beacon slots, Y is a parameter indicating the number of data slots, and Z is a parameter indicating the number of sub-superframes. In this case, the sum of X and Y may be greater than 0 or smaller than or equal to 24 (X and Y are natural numbers), and Z may be a natural number of 0 or greater but smaller than 8.

The structure of the superframe may include resource slots as units, and each of the resource slots may include 256 microseconds in the time domain.

The number of beacon slots may be determined on the basis of the number of coordinators within a PAN.

When the superframe structure includes first and second sub-superframes, the first sub-superframe may be allocated to devices belonging to a first PAN and the second sub-superframe may be allocated to devices belonging to a second PAN.

The first PAN may include one PAN coordinator, at least one coordinator, and at least one terminal, and the second PAN may include a plurality of coordinators.

The first PAN may include one PAN coordinator, at least one coordinator, and at least one terminal, and the second PAN may include at least one coordinator and at least one terminal.

In order to accomplish the object, there is also provided a method for operating a device in a personal area network (PAN), including: obtaining physical layer information regarding a physical layer; scanning a channel on the basis of the physical layer information; selecting a channel on the basis of channel information obtained through the channel scanning process; determining whether or not there is a PAN coordinator with respect to the selected channel; when a PAN coordinator exists in the selected channel, receiving a beacon signal from the PAN coordinator; and transmitting or receiving data by using a superframe structure identified from the PAN coordinator, wherein the superframe structure includes at least one sub-superframe, and the information regarding the superframe structure includes information regarding the number of beacon slots for transmitting a beacon signal in each sub-superframe, the number of data slots for transmitting data in each sub-superframe, and the number of sub-superframes.

The method may further include: when there is a PAN coordinator in the selected channel, transmitting a beacon signal with respect to a terminal by using a beacon slot in the superframe structure identified from the beacon signal.

According to exemplary embodiments of the present invention, multiple channels and multiple transfer rates may be dynamically selected in a homogeneous or heterogeneous physical layer. Also, a group may be dynamically formed by sub-superframe by applying a multi-superframe structure to each channel. Because a prompt subscription and synchronization can be performed in a distributed media access control scheme according to a PAN configuration method and the complexity of a final terminal system in a centralized media access control scheme can be reduced, low power communication can be available at a low cost.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
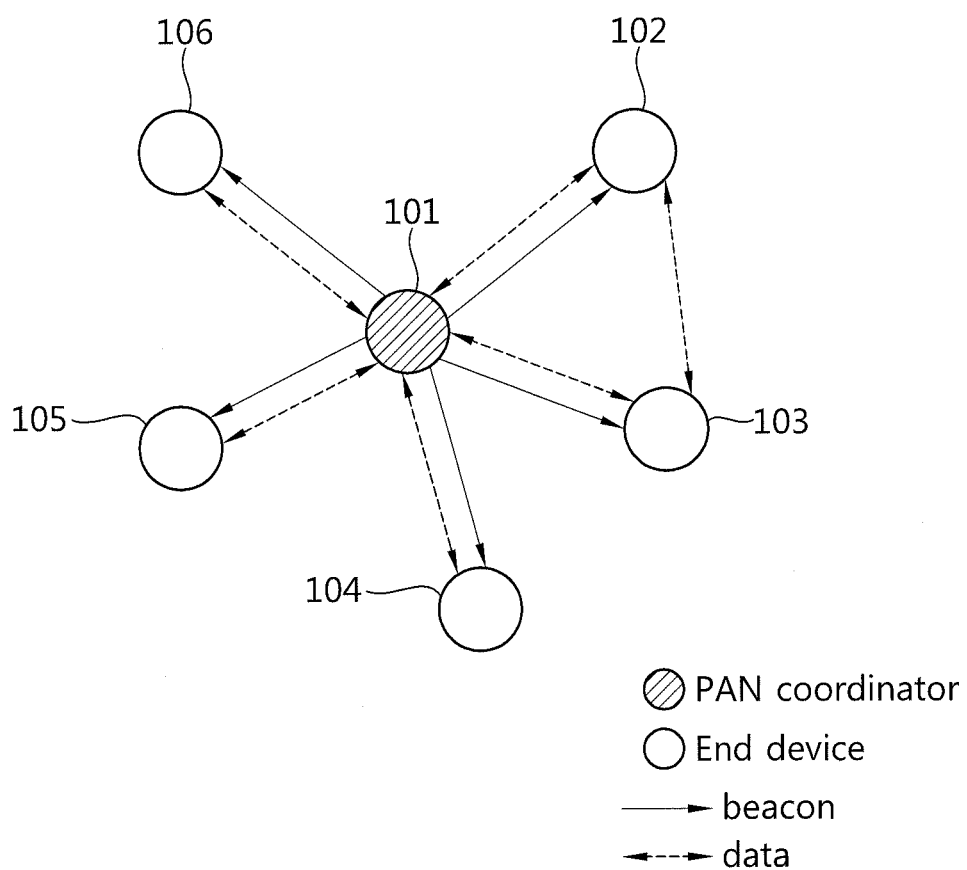
FIG. 1 illustrates a personal area network (PAN), a network including a PAN coordinator and end devices (referred to as 'terminals', hereinafter).

FIG. 1 illustrates a personal area network (PAN).

With reference to FIG. 1, a PAN is a network including a PAN coordinator and end devices (referred to as a 'terminal', hereinafter).

The PAN coordinator 101 refers to a device handling major controlling of the PAN. The PAN coordinator 101 may determine a superframe structure within the PAN. Although not shown, an alternate coordinator (referred to as a 'coordinator', hereinafter) may also exist, besides the PAN coordinator 101, in the PAN. The coordinator refers to a device which may replace the PAN coordinator 101. No coordinator may exist in the PAN or one or more coordinators may exist in the PAN. Compared with the PAN coordinator 101, the coordinator operates in the same manner as the PAN coordinator 101, except that the coordinator does not have a right to determine a superframe structure.

The PAN coordinator 101 transmits a beacon signal to the terminals 102, 103, 104, 105, and 106. The beacon signal transmitted by the PAN coordinator 101 provides information regarding a superframe structure, synchronization, power management, a data transmission section allocation, and the like. The PAN coordinator 101 and the terminals 102 to 106 may transmit data to each other. Also, the terminals (e.g., 102 and 103) may transmit data to each other.

In FIG. 1, the PAN coordinator and the terminals are illustrated to be discriminated from each other, but the device indicated as the PAN coordinator may become a terminal or a device indicated as a terminal may become a PAN coordinator. Namely, in terms of a device, the PAN coordinator, the coordinator, and the terminals may have a different configuration or the same configuration.

Figure 2:
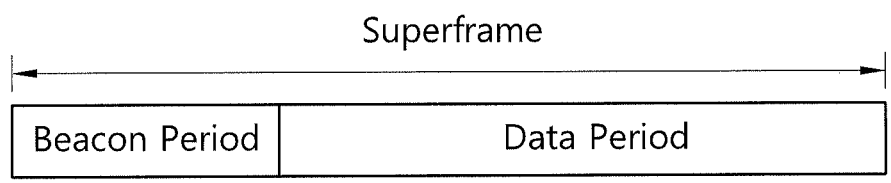
FIG. 2 illustrates an example of a medium access control (MAC) superframe structure.

FIG. 2 illustrates an example of a medium access control (MAC) superframe structure.

With reference to FIG. 2, a MAC superframe (referred to as a 'superframe', hereinafter) includes a beacon period and a data period. The beacon period is a time interval during which a beacon slot can be transmitted, and the data period is a time interval during which a data slot can be transmitted.

The superframe may be configured by units of resource slots (RS). A resource slot may be 256 μs (micro seconds) in a time domain. Namely, the superframe may include a plurality of resource slots.

The superframe may be configured with a time interval of $2^X*2^Y*2^Z*256$ (μs). Here, X is a parameter for determining the number of resource slots (which is called beacon slots) that can be transmitted, Y is a parameter for determining the number of resource slots (which are called data slots) for which data can be allocated and transmitted, and Z is a parameter for determining the number of sub-superframes. Namely, $2^X$ is the number of beacon slots, $2^Y$ is the number of data slots, and $2^Z$ is the number of sub-superframes. X, Y, and Z are 0 or natural numbers.

In the superframe according to the present exemplary embodiment, (X+Y) may be greater than or equal to 0 or smaller than or equal to 24, Y should be greater than or equal to X, and Z has a value within the range of $0 \leq z \leq 8$.

A start time of the first resource slot of the beacon period is called a beacon period start time (BPST). In the superframe, the other remaining resource slots excluding the beacon period form a data period. The data period includes a contention access period (CAP) and a contention free period (CFP). The CAP refers to a time interval during which a terminal contends with respect to a channel access by using a CSMA-CA (carrier sense multiple access with collision avoidance) mechanism, which follows a beacon frame. The CFP is a time interval following the CAP, during which data transmission is performed without a contention.

Unlike the related art superframe structure, the superframe structure according to the present exemplary embodiment may include a plurality of sub-superframes.

Figure 3:
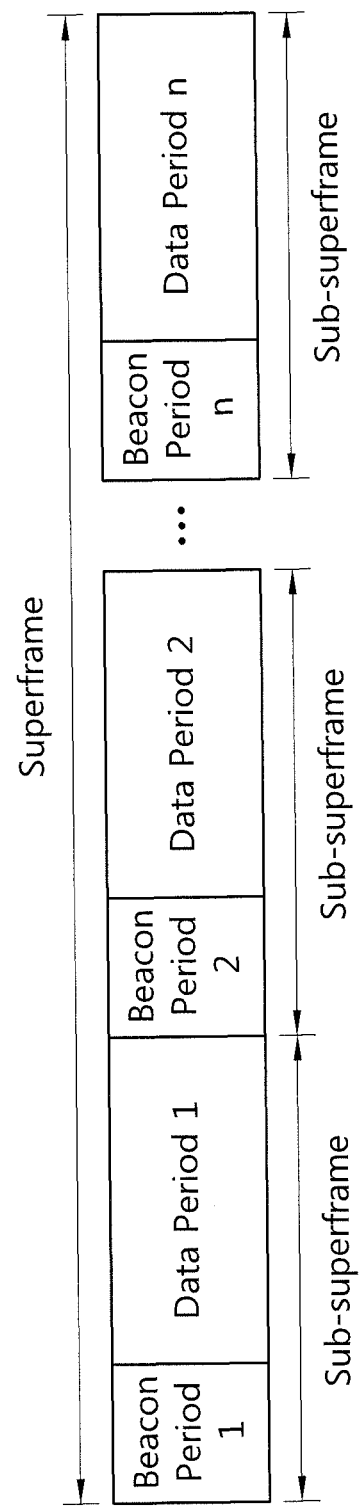
FIG. 3 illustrates an example of a superframe structure including a plurality of sub-superframes.

FIG. 3 illustrates an example of a superframe structure including a plurality of sub-superframes.

With reference to FIG. 3, the superframe includes $2^X*2^Y*2^Z*256$ (μs) like the superframe illustrated in FIG. 3. However, the superframe illustrated in FIG. 3 includes a plurality of sub-superframes and each of the sub-superframes includes a beacon period and a data period. In this case, $2^Z$ indicates the number of sub-superframes, and as mentioned above, Z is one natural number among values ranging from 0 to 8. For example, when Z is 2, the number of sub-superframes is 4, and when Z is 3, the number of sub-superframes is 8. The superframe structure including a plurality of sub-superframes may be expressed as a superframe structure including a plurality of beacon periods in one channel. The superframe structure illustrated in FIG. 2 may be expressed as a superframe structure including one beacon period in one channel.

Figure 4:
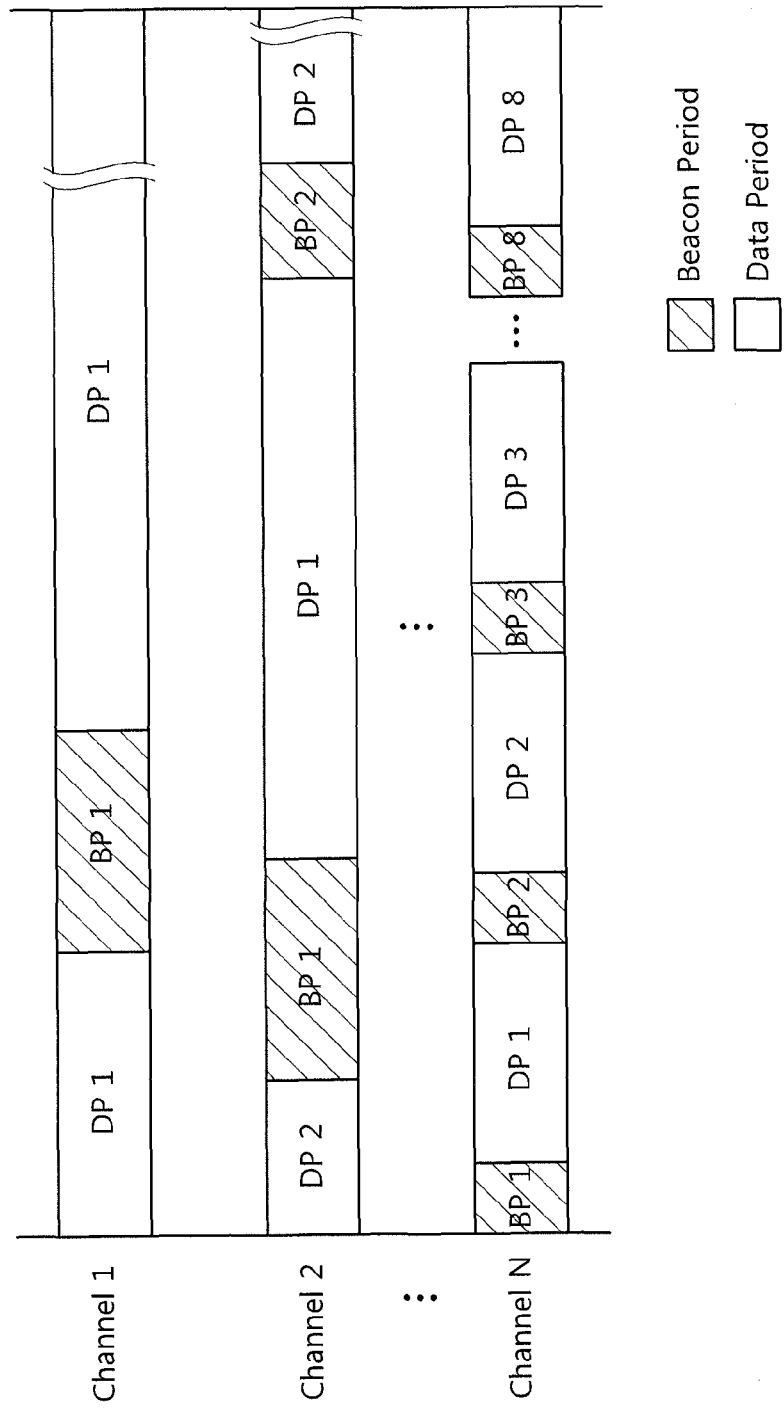
FIG. 4 illustrates an example of a superframe structure simultaneously formed by a plurality of PANs by using channels provided in homogeneous or heterogeneous physical layers.

FIG. 4 illustrates an example of a superframe structure simultaneously formed by a plurality of PANs by using channels provided in homogeneous or heterogeneous physical layers.

With reference to FIG. 4, a channel 1 includes one sub-superframe in one superframe, and a channel 2 includes two sub-superframes in one superframe, and a channel N includes eight sub-superframes in one superframe. In this manner, the superframes may include different number of sub-superframes by channel, and each of the sub-superframes may start at a different time.

A plurality of PANs may exist in an overall system. For example, PAN #1, PAN #2, and PAN #3 may exist in the overall system. In this case, the superframe structure represented in the channel 1 may be a superframe structure of the PAN #1, the superframe structure represented in the channel 2 may be a superframe structure of the PAN #2, and the superframe structure represented in the channel N may be a superframe structure of the PAN #3. Namely, the various PANs may communicate with each other through the channels having different superframe structures. However, the superframe structure in FIG. 4 is merely illustrative, and it may variably changed such that the PAN #1 and the PAN #2 may use the superframe structure of the channel 1 while only the PAN #3 may use the superframe structure of the channel 2.

Figure 5:
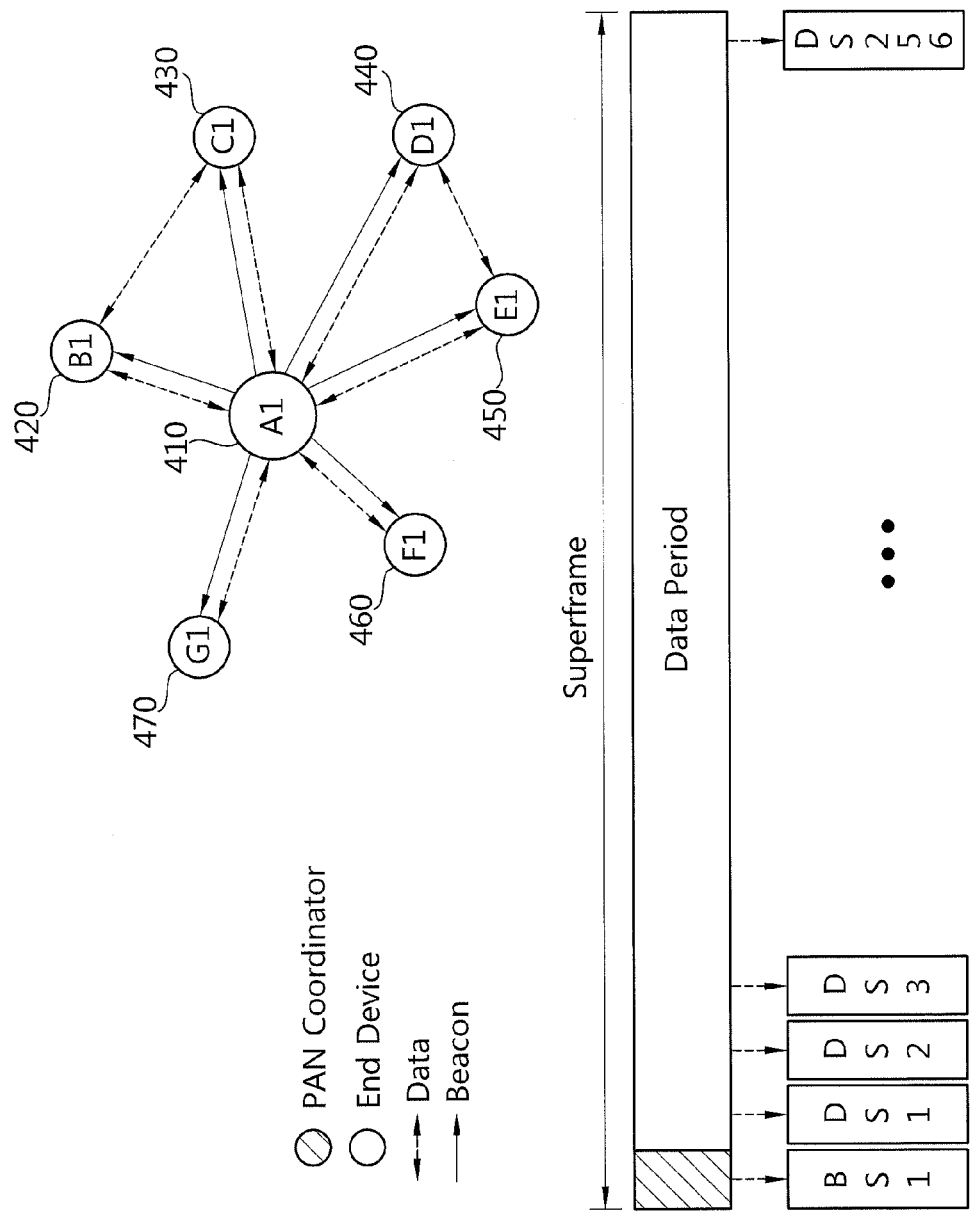
FIG. 5 illustrates a first example of the PAN and an example of a superframe structure used in the PAN.

FIG. 5 illustrates a first example of the PAN and an example of a superframe structure used in the PAN.

With reference to FIG. 5, the PAN includes one PAN coordinator 410 and a plurality of end devices (or terminals) 420, 430, 440, 450, 460, and 470. When the PAN is configured in this manner, the superframe structure may include one beacon slot and a plurality of data slots. For example, the superframe structure may have $2^0*2^8*2^0*256$ (µs) in the time domain. Namely, the superframe includes one beacon slot, 256 data slots and the number of sub-superframes is 1, namely, the superframe wholly constitutes one sub-superframe.

The PAN coordinator 410 transmits a beacon frame including network management information (i.e., information regarding the superframe structure, synchronization, power management, data transmission interval allocation, and the like) to the terminals 420 to 470 through the beacon slots. The respective terminals 420 to 470 match synchronization with the BPST of the beacon frame transmitted by the PAN to coordinator 410, request a required data slot through a subscription procedure, and then perform data transmission and reception. The data slot is uni-directional, so when one terminal transmits data, the other terminal may only receive the data. Namely, one terminal cannot simultaneously transmit and receive data, and when one terminal transmits data through a data slot, the other terminals receive the data and transmit data through a different data slot.

Figure 6:
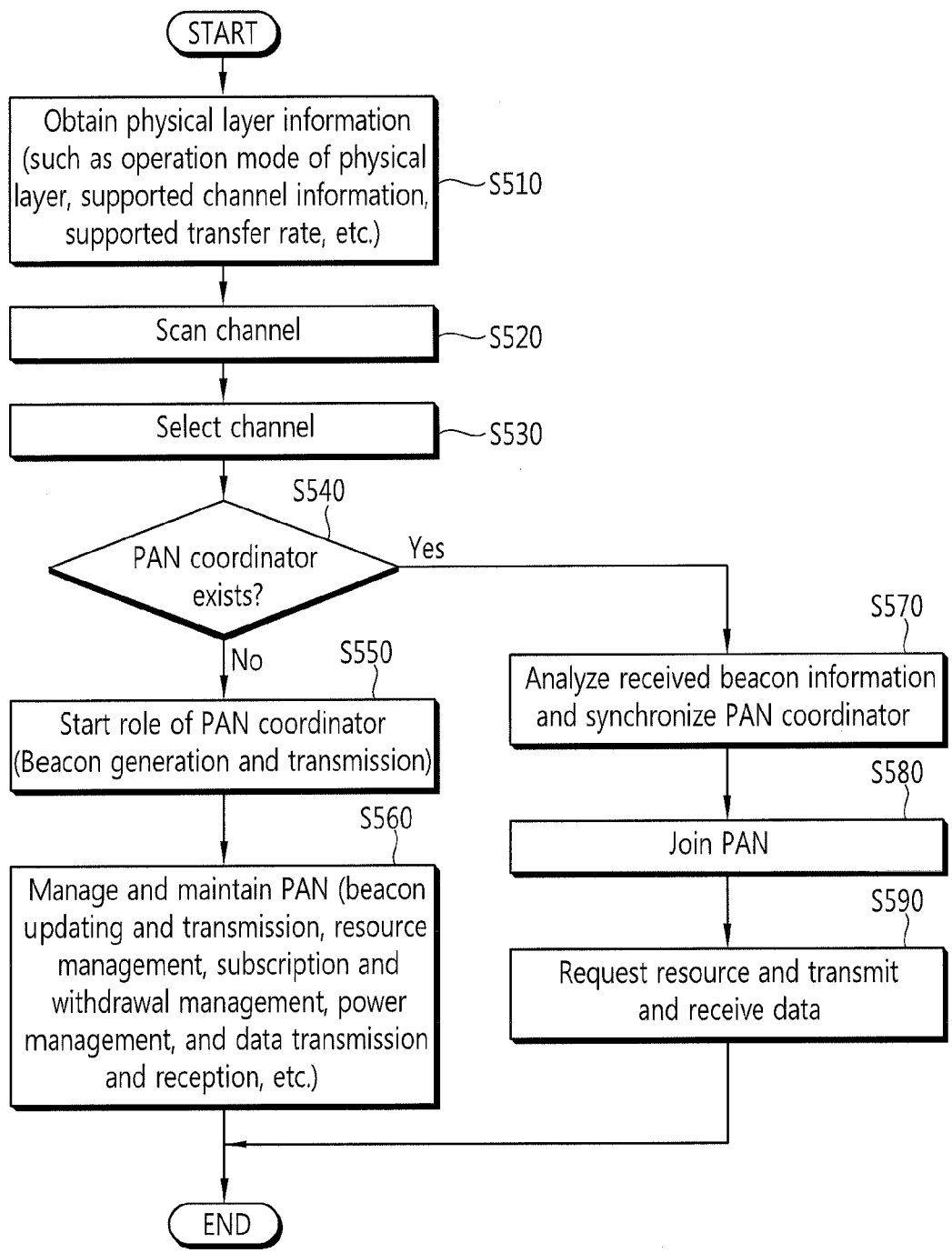
FIG. 6 is a flow chart illustrating an operation process of each device in the PAN of FIG. 5.

FIG. 6 is a flow chart illustrating an operation process of each device in the PAN of FIG. 5.

With reference to FIGS. 5 and 6, for example, when power of the A1 device 410 is turned on, the A1 device 410 obtains physical layer information such as an operation mode of a physical layer, a supported transfer rate, supported channel information, and the like (step S510).

The A1 device 410 performs a channel scanning procedure on the basis of the obtained physical layer information (step S520).

The A1 device 410 analyzes channel information of each channel obtained through the scanning procedure and selects one or more desired channels (step S530). FIG. 5 shows the case in which only one channel is selected.

The A1 device 410 determines whether or not there is a PAN coordinator in the selected channel (step S540).

When no PAN coordinator exists in the channel, the A1 device 410 serves as a PAN coordinator (step S550). Namely, the A1 device 410 generates a beacon frame including content such as a PANID indicating an ID of a PAN, a DEVID indicating its own ID, its MAC address, its beacon slot information, as well as information regarding the number of beacon slot (one, in this case X=0), the number of data slots (256, in this case, Y=8), the number sub-superframes (one, in this case, Z=0), required for forming a superframe structure, and transmits the generated beacon frame.

Thereafter, the A1 device 410 manages and maintains the PAN (step S560). Namely, the A1 device 410 repeatedly performs updating and transmission of the beacon frame, data transmission and reception, and the like, by reflecting a management of subscription and withdrawal of the devices (or terminals) which have received the beacon frame transmitted by the A1 device 410, resource request processing, power management, and the like, at every superframe period.

Meanwhile, the other devices 420 to 470, excluding the A1 device 410, perform the physical layer information obtaining process (step S510), the channel scanning process (step S520), the channel selecting process (step S530), and then check the presence of a PAN coordinator (step S540), like the A1 device 410 does. As described above, when it is assumed that the A1 device 410 serves as a PAN coordinator, the devices 420 to 470 analyze the beacon frame received from the A1 device and perform a synchronization procedure with the A1 device (namely, the PAN coordinator). After completing the beacon frame analyzing and synchronization procedure, the devices 420 to 470 selectively join the PAN as necessary (step S580). Namely, the devices 420 to 470 perform a subscription procedure to the PAN coordinator of the PAN.

After completing the subscription procedure, when the devices 420 to 470 have data to be transmitted, they perform a resource request procedure and confirming procedure and then perform a data transmission and reception with the corresponding device (step S590). Namely, the devices 420 to 470, excluding the A1 device (namely, the PAN coordinator), repeatedly perform the foregoing steps S570 to S590 at every superframe period.

The PAN and the operation method in the PAN as described above with reference to FIGS. 5 and 6 may be called a centralized media access control scheme. This method to is advantageous in that the complexity of the terminals can be reduced and can be used at low power consumption and at a low cost.

Figure 7:
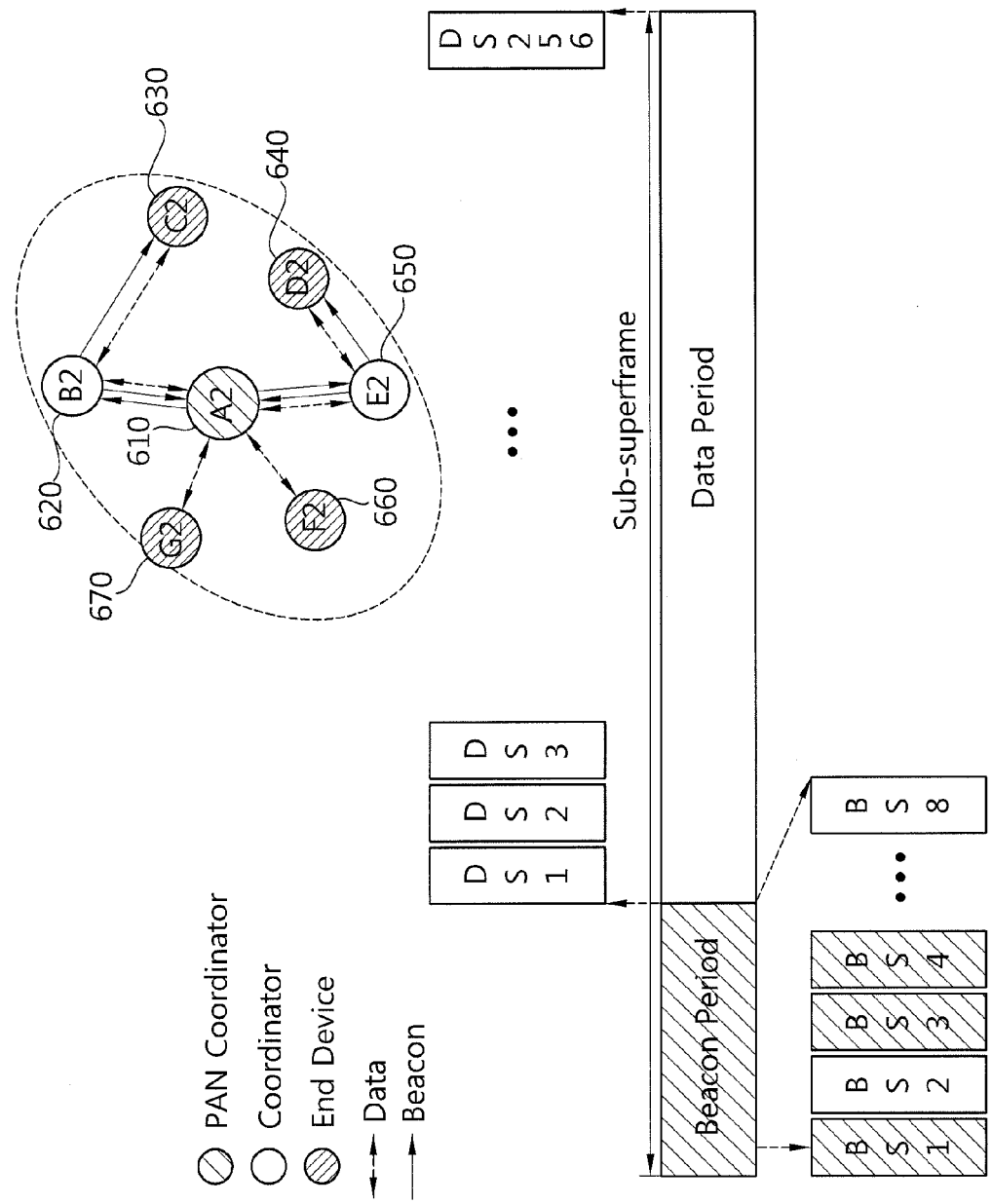
FIG. 7 illustrates a second example of the PAN and an example of a superframe structure used in the PAN.

FIG. 7 illustrates a second example of the PAN and an example of a superframe structure used in the PAN.

With reference to FIG. 7, the PAN includes one PAN coordinator 610, a plurality of coordinators 620 and 650, and a plurality of end devices (or terminals) 630, 640, 660, and 670. When the PAN is configured in this manner, an available superframe structure may include a plurality of beacon slots and a plurality of data slots in consideration of the number of coordinators in each sub-superframe. For example, the superframe may have $2^3*2^8*2^0*256$ (µs) in the time domain. Namely, the superframe includes eight beacon slots, 256 data slots and the number of sub-superframes is 1, namely, the superframe wholly constitutes one sub-superframe. Compared with the superframe in FIG. 5, the superframe illustrated in FIG. 7 includes a plurality of beacon slots in the beacon period to allow the PAN coordinator 610 and the coordinators 620 and 650 to secure the beacon slots to transmit beacon frames.

The PAN coordinator 610 transmits a beacon frame including network management information (i.e., information regarding the superframe structure, synchronization, power management, data transmission interval allocation, and the like) to the terminals 630, 640, 660, and 670 and the coordinators 620 and 650 through a beacon slot (e.g., BS1).

The coordinators 620 and 650, not the PAN coordinator 610, operate in the same manner as the PAN coordinator 610, except that it has no right to determine the superframe structure. The coordinator 620 does not have relation to request resource by using a command frame and be permitted to use resource, like the terminals, in case of resource allocation. Namely, the coordinator 620 may perform a resource allocation process equally to the PAN coordinator 610 by using a beacon or a command frame through an information element (IE) field with respect to the use of an empty data slot which is currently not in use among the data slots. Each terminal matches synchronization with the BPST by using the beacon frame transmitted by the PAN coordinator 610 or the coordinators 620 and 650 to which each terminal may join, and requests a data slot through a subscription procedure and then perform data transmission and reception when necessary. The data slot is uni-directional, so when one device (i.e., terminal) transmits data, the other device only receives the data.

Figure 8:
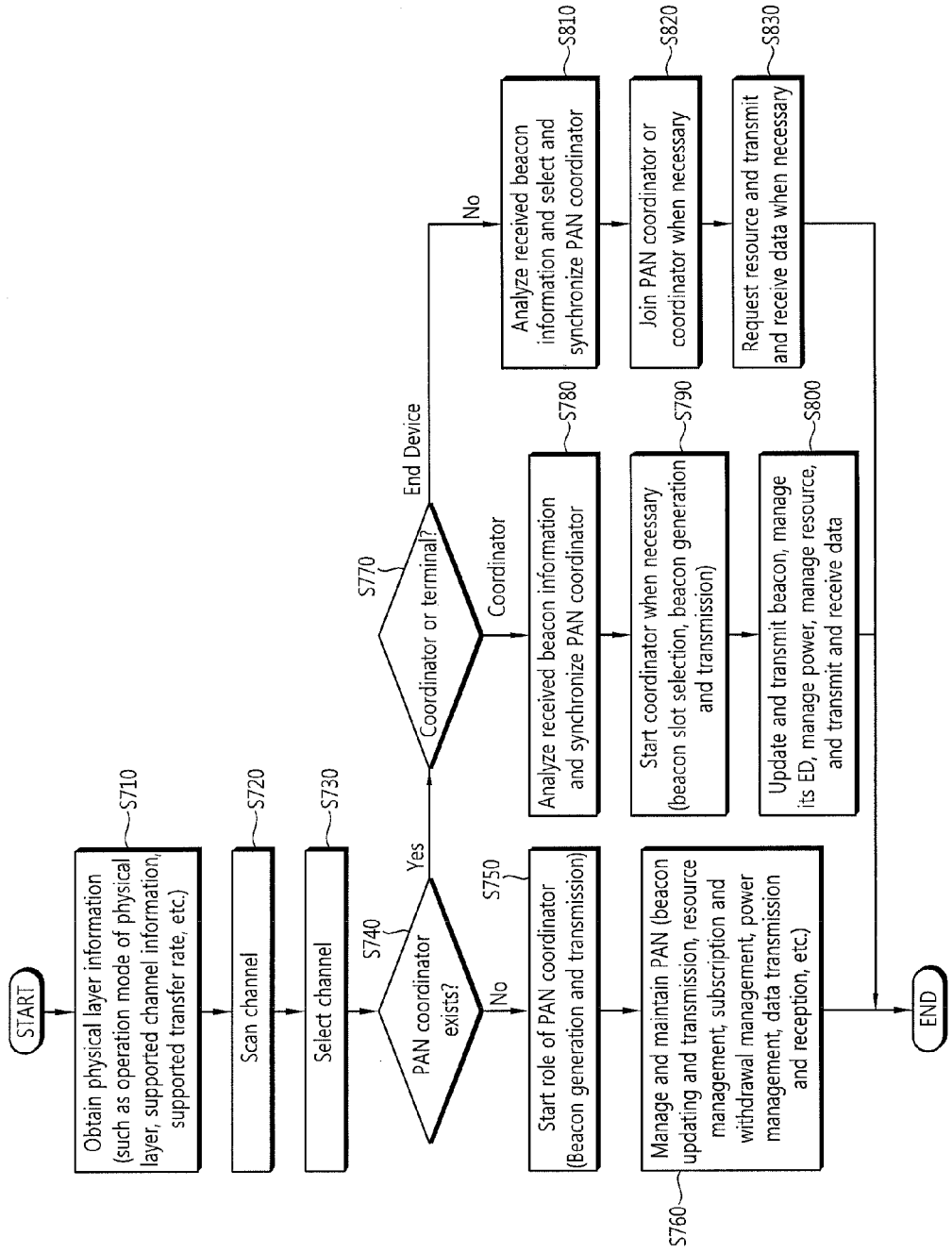
FIG. 8 is a flow chart illustrating an operation process of each device in the PAN of FIG. 7.

FIG. 8 is a flow chart illustrating an operation process of each device in the PAN of FIG. 7.

With reference to FIGS. 7 and 8, when power of the A2 device 610 as shown in FIG. 7 is turned on, the A2 device 610 obtains physical layer information such as an operation mode of a physical layer, a supported transfer rate, supported channel information, and the like (step S710).

The A2 device 610 performs a channel scanning procedure on the basis of the obtained physical layer information (step S720).

The A2 device 610 analyzes channel information of each channel obtained through the scanning procedure and selects one or more desired channels (step S730). FIG. 7 shows the case in which only one channel is selected.

The A2 device 610 determines whether or not there is a PAN coordinator in the selected channel (step S740).

When no PAN coordinator exists in the channel, the A2 device 610 serves as a PAN coordinator (step S750). Namely, the A2 device 610 generates a beacon frame including content such as a PANID indicating an ID of a PAN, a DEVID indicating its own ID, its MAC address, its beacon slot information, as well as information regarding the number beacon slots (eight, in this case X=3), the number of data slots (256, in this case, Y=8), the number sub-superframes (one, in this case, Z=0), required for forming a superframe structure, and transmits the generated beacon frame.

Thereafter, the A2 device 610 manages and maintains the PAN (step S760). Namely, the A2 device 610 repeatedly performs updating and transmission of the beacon frame, data transmission and reception, and the like, by reflecting a management of subscription and withdrawal of the devices (or terminals) (660 and 670) which have received the beacon frame transmitted by the A2 device 610, resource request processing, power management, and the like, at every superframe period (step S760).

Meanwhile, the B2 device 620 and the E2 device 650 perform the physical layer information obtaining process (step S710), the channel scanning process (step S720), the channel selecting process (step S730), and then check the presence of a PAN coordinator (step S740), like the A2 device 610 does.

As described above, when it is assumed that the A2 device 610 serves as a PAN coordinator, the B2 device 620 and the E2 device 650 determine whether to serve as a coordinator or an end device (or a terminal), respectively (step S770).

When the B2 device 620 and the E2 device 650 determine to operate as a coordinator, respectively, they analyze the beacon frame received from the PAN coordinator 610 and perform a synchronization procedure with the PAN coordinator 610 (step S780). After completing the beacon frame analyzing and synchronization procedure, the B2 device 620 and the E2 device 650 generate a beacon, selects a beacon slot and transmit a beacon frame (step S790).

The B2 device 620 and the E2 device 650 repeatedly perform generation and transmission of the beacon frame, data transmission and reception, and the like, by reflecting a management of subscription and withdrawal of the devices C2 device 630 and the D2 device 640 which have received the beacon frame transmitted by the B2 device 620 and the E2 device 650, resource request processing, power management, and the like, at every superframe period (step S800). The B2 device 620 and the E2 device 650 repeatedly perform the foregoing steps S780 to S800 at every superframe period.

Meanwhile, the C2 device 630, the D2 device 650, the F2 device 660, and the G2 device 670 perform the physical layer information obtaining process (step S710), the channel scanning process (step S720), the channel selecting process (step S730), and then check the presence of a PAN coordinator (step S740), like the A2 device 610, the B2 device 620, and the E2 device 650 do (step S740).

The C2 device 630, the D2 device 650, the F2 device 660, and the G2 device 670 determine whether to serve as a coordinator or an end device (or a terminal), respectively (step S770). When the C2 device 630, the D2 device 650, the F2 device 660, and the G2 device 670 determine to operate as a terminal, they analyze the beacon frame received from the PAN coordinator 610 or the coordinators 620 and 650, select the PAN coordinator 610 or the coordinators 620 and 650 and perform a synchronization procedure.

If necessary, the C2 device 630, the D2 device 650, the F2 device 660, and the G2 device 670 perform a subscription procedure with respect to the selected PAN coordinator 610 or the coordinators 620 and 650 (step S820). After completing the subscription procedure, if necessary, the C2 device 630, the D2 device 650, the F2 device 660, and the G2 device 670 perform data transmission and reception with a corresponding device through a resource request procedure and confirmation procedure (step S830). The C2 device 630, the D2 device 650, the F2 device 660, and the G2 device 670 perform the foregoing steps S810 to S830 at every superframe period.

Figure 9:
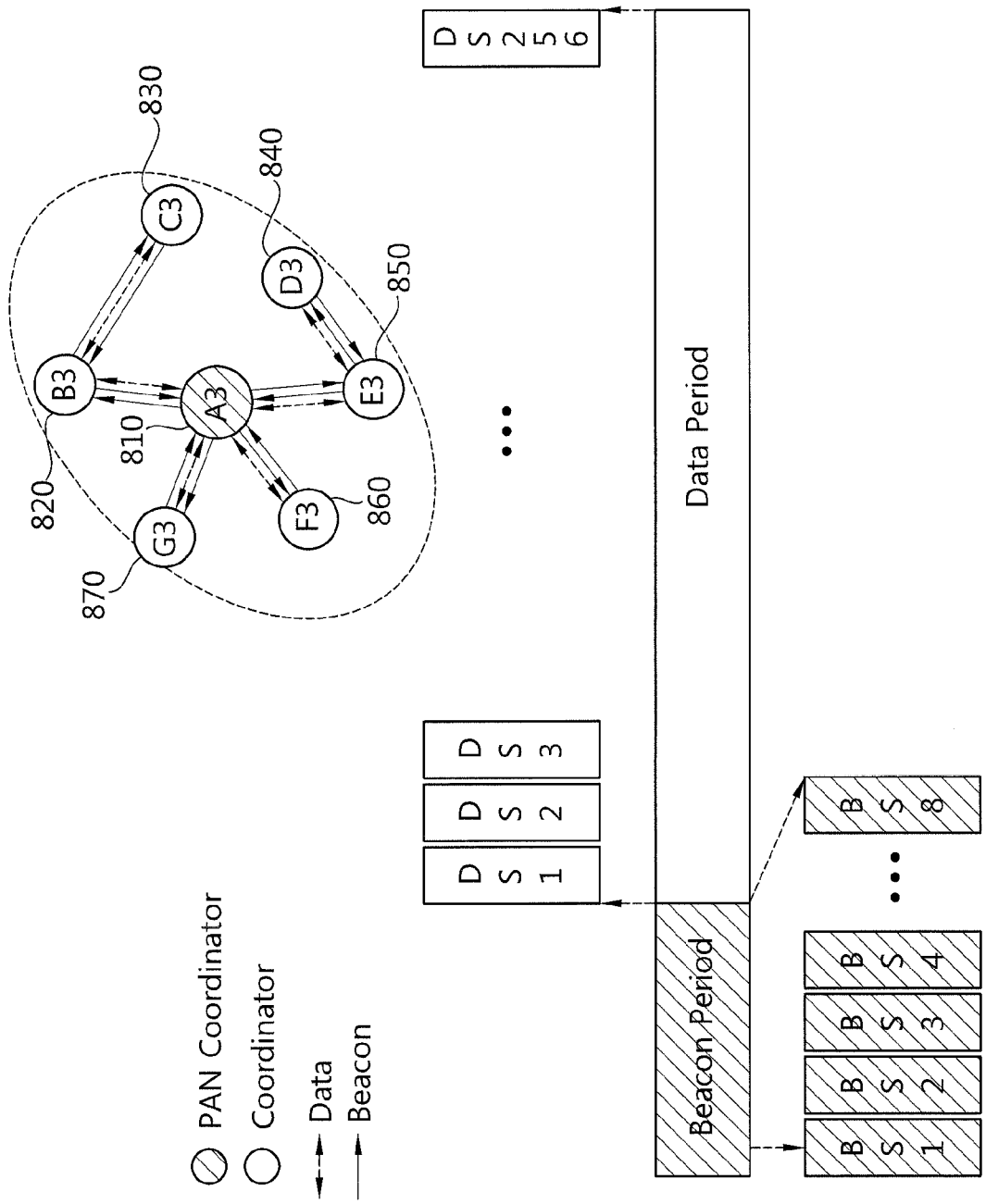
FIG. 9 illustrates a third example of the PAN and an example of a superframe structure used in the PAN.

FIG. 9 illustrates a third example of the PAN and an example of a superframe structure used in the PAN.

With reference to FIG. 9, the PAN includes one PAN coordinator 810 and a plurality of coordinators 820, 830, 840, 850, 860, and 870. When the PAN is configured in this manner, an available superframe structure may include a plurality of beacon slots and a plurality of data slots. For example, the superframe may have $2^3*2^8*2^0*256$ (μs) in the time domain. Namely, the superframe includes eight beacon slots, 256 data slots and the number of sub-superframes is 1, namely, the superframe wholly constitutes one sub-superframe. The number of the beacon slots may be determined in consideration of the number of the PAN coordinators and the coordinates, and in this case, a margin may be provided in consideration of the fact that there may be a coordinator which may be additionally introduced to the PAN.

The PAN coordinator 810 transmits a beacon frame including network management information (i.e., information regarding the superframe structure, synchronization, power management, data transmission interval allocation, and the like) to the coordinators 820 to 870 through a beacon slot (e.g., BS1). The coordinators 820 to 870, not the PAN coordinator, operate in the same manner as the PAN coordinator 610, except that it has no right to determine the superframe structure. Namely, the respective coordinators 820 to 870 transmit their beacon frame through their beacon slot (any one of BS2 to BS8) of the beacon period and receive a beacon frame of other devices through a different beacon slot. The beacon frame includes network management information to perform device synchronization, power management, a data transmission interval allocation, and the like. Also, in order to perform a resource reservation procedure, a resource reservation command frame may be used.

Figure 10:
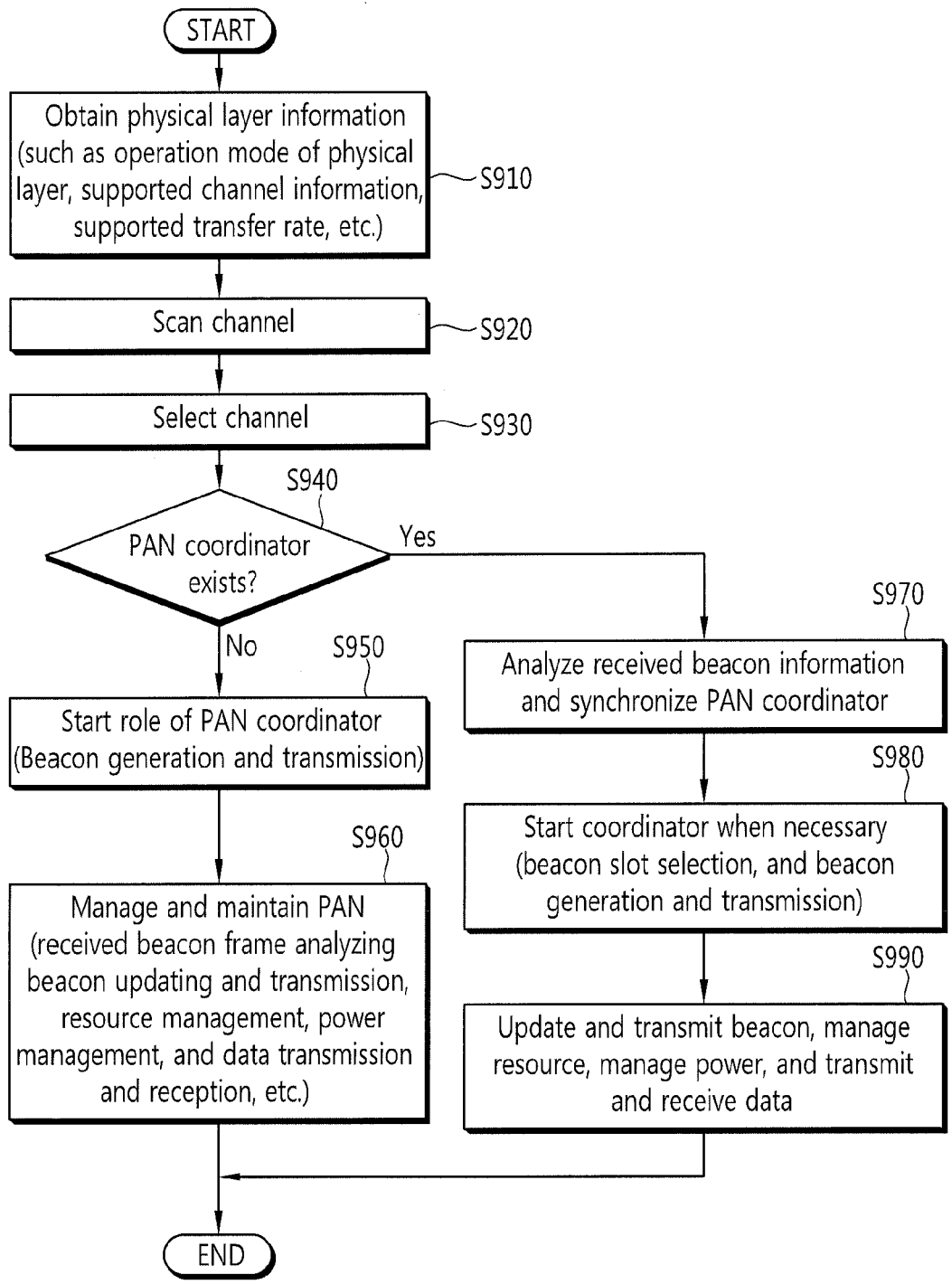
FIG. 10 is a flow chart illustrating an operation process of each device in the PAN of FIG. 9.

FIG. 10 is a flow chart illustrating an operation process of each device in the PAN of FIG. 9.

With reference to FIGS. 9 and 10, when power of the A3 device 810 as is turned on, the A3 device 810 obtains physical layer information such as an operation mode of a physical layer, a supported transfer rate, supported channel information, and the like (step S910).

The A3 device 810 performs a channel scanning procedure on the basis of the obtained physical layer information (step S920).

The A3 device 810 analyzes channel information of each channel obtained through the scanning procedure and selects one or more desired channels (step S930). FIG. 9 shows the case in which only one channel is selected.

The A3 device 810 determines whether or not there is a PAN coordinator in the selected channel (step S940).

When no PAN coordinator exists in the channel, the A3 device 810 serves as a PAN coordinator (step S950). Namely, the A3 device 810 generates a beacon frame including content such as a PANID indicating an ID of a PAN, a DEVID indicating its own ID, its MAC address, its beacon slot information, as well as information regarding the number beacon slots (eight, in this case X=3), the number of data slots (256, in this case, Y=8), the number sub-superframes (one, in this case, Z=0), required for forming a superframe structure, and transmits the generated beacon frame.

Thereafter, the A3 device 810 manages and maintains the PAN (step S960). Namely, the A3 device 810 analyzes the beacon frames received from the coordinators 820 to 870 and repeatedly performs updating and transmission of the beacon frame, data transmission and reception, and the like, at every superframe period.

Meanwhile, the other coordinators 820 to 870, excluding the PAN coordinator, perform the physical layer information obtaining process (step S910), the channel scanning process (step S920), the channel selecting process (step S930), and then check the presence of a PAN coordinator (step S940), like the A3 device 810 does.

As described above, when it is assumed that the A3 device 810 serves as a PAN coordinator, the coordinators 820 to 870 analyze the beacon frames received from the other coordinators and perform a synchronization procedure with the PAN coordinator 810, respectively (step S970).

After completing the information analyzing and synchronization procedure, the coordinators 820 to 870 generate a beacon, select a beacon slot, and transmit a beacon frame, respectively (step S980).

When the coordinators 820 to 870 have data to be transmitted, they perform a procedure for allocating required resource and then perform a data transmission and reception with the corresponding device. Also, they repeatedly perform the procedure of analyzing a beacon frame of a different coordinator or the PAN coordinator received at every superframe period, reflecting the same in their beacon frame, and transmitting the at every superframe period.

The PAN and the operation method in the PAN as described above with reference to FIGS. 7 to 10 may be called a distributed media access control scheme. This method is advantageous in that the coordinators can provide a rapid synchronization, subscription/withdrawal, and resource allocation function.

Figure 11:
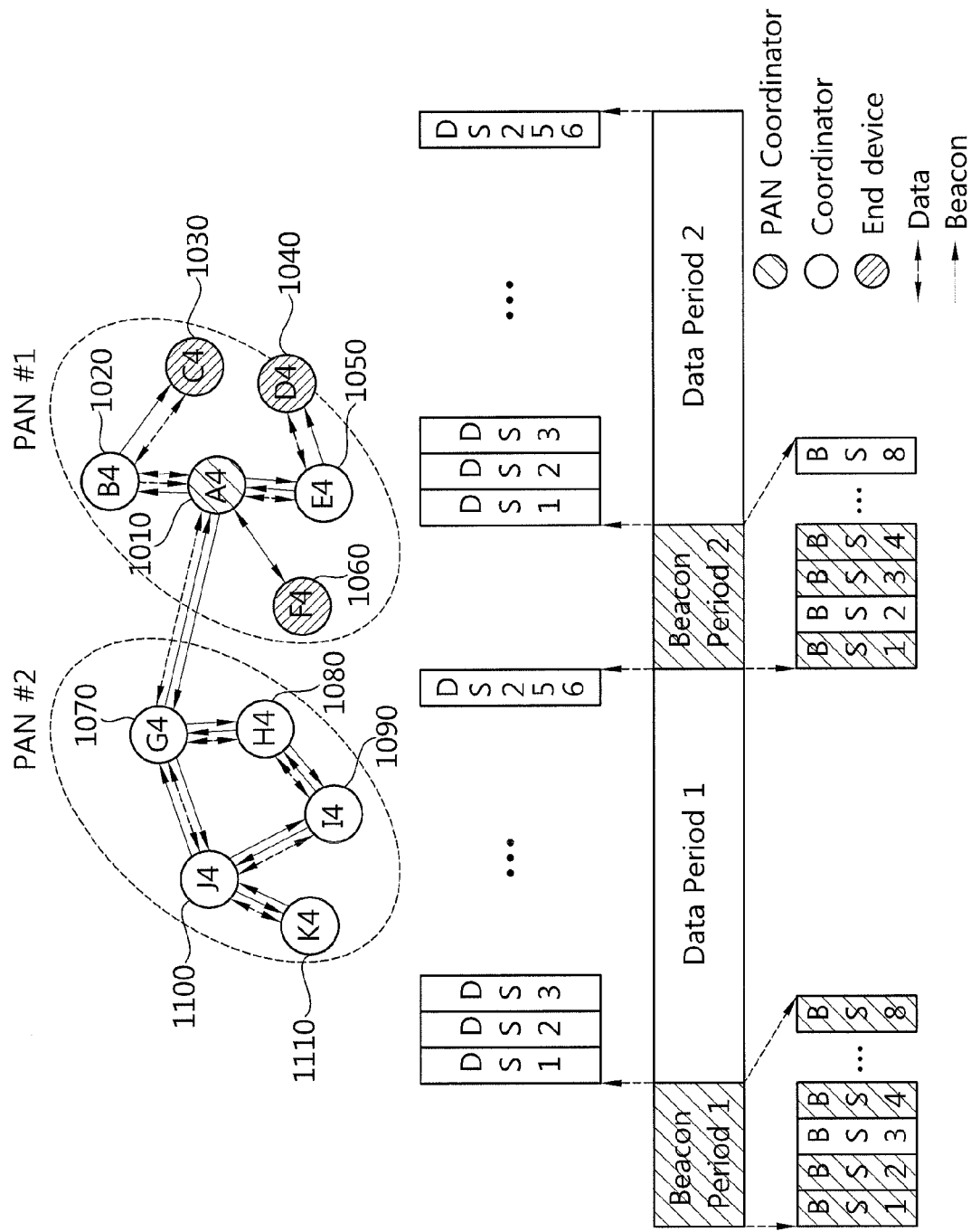
FIG. 11 illustrates a plurality of PANs configured according to different schemes and a superframe structure which may be used in such PANs.

FIG. 11 illustrates a plurality of PANs configured according to different schemes and a superframe structure which may be used in such PANs.

With reference to FIG. 11, a PAN#1 may include a PAN coordinator 101, a plurality of coordinators 1020 and 1050, and a plurality of terminals 1030, 1040, and 1060. A PAN#2 may include a plurality of coordinators 1070, 1080, 1090, 1100 and 1110. When the plurality of PANs configured in different manners exist, a superframe can be configured to include a plurality of sub-superframes. For example, the superframe may have $2^3 * 2^8 * 2^1 * 256$ (μs) in the time domain.

Namely, the superframe includes two sub-superframes, and each of the sub-superframes may include eight beacon slots and 256 data slots.

Each device in the respective PANs may operate in the same or similar manner as in the cases illustrated in FIGS. 8 and 10. Namely, the devices of the PAN#1 illustrated in FIG. 11 operate like the case illustrated in FIG. 8. Also, the devices of the PAN#2 illustrated in FIG. 11 operate like the case illustrated in FIG. 10. In this case, the devices of the PAN#1 and the PAN#2 may operate in different sub-superframes. In this case, the devices operating by using the different sub-superframes may dynamically select a data transfer rate between transmission and reception devices.

The superframe structure uniformly applied to the plurality of PANs configured in different manners include the plurality of sub-superframes. And the respective sub-superframes are allocated to the respective PANs, and in this case, sub-superframe structures most appropriate for the respective PANs may be applied; namely, the advantages of the centralized medium access control scheme and the distributed medium access control scheme can be utilized according to the structures of the PANs. This advantage can be hardly obtained in the conventional superframe structure which includes a single beacon slot and a plurality of data slots.

In the plurality of PANs, the single PAN coordinator 1010 may determine the superframe structure with respect to the plurality of PANs. In this case, the respective coordinators 1020, 1050, 1070, 1080, 1090, 1100, and 1110 may receive a beacon frame from the PAN coordinator 1010 to obtain information regarding the superframe structure. When a beacon frame can be transmitted and received between the coordinators operating in the different sub-superframes, a single hop or multi-hop data transmission and reception can be available between sub-superframes by using the coordinators.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for operating a device in a personal area network (PAN), the method comprising:
    obtaining physical layer information regarding a physical layer;
    scanning a channel on the basis of the physical layer information;
    selecting a channel on the basis of channel information obtained through the channel scanning process;
    determining whether or not there is a PAN coordinator with respect to the selected channel; and
    when a PAN coordinator does not exist in the selected channel, transmitting a beacon signal including information regarding a superframe structure,
    wherein the superframe structure comprises at least one sub-superframe, and the information regarding the superframe structure comprises information regarding the number of beacon slots for transmitting a beacon signal in each sub-superframe, the number of data slots for transmitting data in each sub-superframe, and the number of sub-superframes.

2. The method of claim 1, wherein the superframe structure is $2^X * 2^Y * 2^Z * 256$ micro-seconds in a time domain, wherein X is a parameter indicating the number of beacon slots, Y is a parameter indicating the number of data slots, and Z is a parameter indicating the number of sub-superframes.

3. The method of claim 2, wherein the sum of X and Y is greater than 0 and smaller than or equal to 24 (X and Y are natural numbers), and Z is a integer number ranging 0 to 8.

4. The method of claim 1, wherein the structure of the superframe comprises resource slots as units, and each of the resource slots comprises 256 microseconds in the time domain.

5. The method of claim 1, wherein the number of beacon slots is determined on the basis of the number of coordinators within a PAN.

6. The method of claim 1, wherein when the superframe structure includes a first sub-superframe and a second sub-superframe, the first sub-superframe is allocated to devices belonging to a first PAN and the second sub-superframe is allocated to devices belonging to a second PAN.

7. The method of claim 6, wherein the first PAN comprises one PAN coordinator, at least one coordinator, and at least one terminal, and the second PAN comprises a plurality of coordinators.

8. The method of claim 6, wherein the first PAN comprises one PAN coordinator, at least one coordinator, and at least one terminal, and the second PAN comprises at least one coordinator and at least one terminal.

9. A method for operating a device in a personal area network (PAN), the method comprising:
   obtaining physical layer information regarding a physical layer;
   scanning a channel on the basis of the physical layer information;
   selecting a channel on the basis of channel information obtained through the channel scanning process;
   determining whether or not there is a PAN coordinator with respect to the selected channel;
   receiving a beacon signal from the PAN coordinator when a PAN coordinator exists in the selected channel; and
   transmitting or receiving data by using a superframe structure identified from the PAN coordinator,
   wherein the superframe structure comprises at least one sub-superframe, and the information regarding the superframe structure comprises information regarding the number of beacon slots for transmitting a beacon signal in each sub-superframe, the number of data slots for transmitting data in each sub-superframe, and the number of sub-superframes.

10. The method of claim 9, further comprising:
    when there is a PAN coordinator in the selected channel, transmitting a beacon signal with respect to a terminal by using a beacon slot in the superframe structure identified from the beacon signal.

11. The method of claim 9, wherein the number of the beacon slots is determined on the basis of the number of the coordinators in the PAN.

12. The method of claim 9, wherein the superframe structure is $2^X*2^Y*2^Z*256$ micro-seconds in a time domain, wherein X is a parameter indicating the number of beacon slots, Y is a parameter indicating the number of data slots, and Z is a parameter indicating the number of sub-superframes.

13. The method of claim 12, wherein the sum of X and Y is greater than 0 or smaller than or equal to 24 (X and Y are natural numbers), and Z is a integer number ranging 0 to 8.

14. The method of claim 12, wherein the structure of the superframe comprises resource slots as units, and each of the resource slots comprises 256 microseconds in the time domain.

\* \* \* \* \*